(12) United States Patent
Dwarkin et al.

(10) Patent No.: US 6,454,470 B1
(45) Date of Patent: Sep. 24, 2002

(54) OPTOELECTRONIC INTERCONNECT MODULE

(75) Inventors: Robert Dwarkin, Chicago; Gregg Rapala, Arlington Heights, both of IL (US)

(73) Assignee: Stratos Lightwave, Inc., Chicago, IL (US)

( * ) Notice: Subject to any disclaimer, the term of this patent is extended or adjusted under 35 U.S.C. 154(b) by 103 days.

(21) Appl. No.: 09/652,487

(22) Filed: Aug. 31, 2000

(51) Int. Cl.[7] .................................................. G02B 6/36
(52) U.S. Cl. .............................. 385/93; 385/92; 385/88; 385/31; 385/33
(58) Field of Search .............................. 385/31, 33, 88, 385/89, 92, 93, 14

(56) References Cited

U.S. PATENT DOCUMENTS

| | | | |
|---|---|---|---|
| 4,130,345 A | 12/1978 | Doellner | 385/31 X |
| 4,262,362 A | 4/1981 | Kiernan et al. | 385/31 X |
| 4,497,536 A | 2/1985 | Payne et al. | 385/31 X |
| 4,767,171 A | 8/1988 | Keil et al. | 385/33 X |
| 5,127,075 A | 6/1992 | Althaus et al. | 385/94 |
| 5,315,609 A | 5/1994 | Tanaka et al. | 372/43 |
| 5,463,707 A * | 10/1995 | Nakata et al. | 385/35 |
| 5,528,407 A | 6/1996 | Nakata et al. | 359/152 |
| 5,552,918 A | 9/1996 | Krug et al. | 359/152 |
| 5,708,743 A * | 1/1998 | DeAndrea et al. | 385/88 |
| 6,040,934 A | 3/2000 | Ogusu et al. | 359/152 |
| 6,086,263 A | 7/2000 | Selli et al. | 385/88 |
| 6,106,160 A * | 8/2000 | Kikuchi et al. | 385/88 |
| 6,282,000 B1 * | 8/2001 | Kikuchi et al. | 359/152 |

OTHER PUBLICATIONS

"Free–Space Fiber Optic Switches Based on MEMS Vertical Torsion Mirrors," Journal of Lightwave Technology, vol. 17, No. 1, Jan. 1999.

* cited by examiner

*Primary Examiner*—Brian Healy
(74) *Attorney, Agent, or Firm*—Steven M. Evans

(57) ABSTRACT

An optoelectronic interconnect module comprising a housing having a first aperture on a first side of the housing for receiving an optical ferrule and a second aperture on a second side of the housing for receiving a semiconductor die. A mirror is mounted within the housing at an angle for reflecting optical transmissions between the first and second apertures. A first optical lens is mounted between the first aperture and the mirror, and a second optical lens is mounted between the second aperture and the mirror. The optoelectronic interconnect module transmits an electronically modulated optical signal between an optical fiber in the first aperture and an optoelectronic semiconductor die adjacent to the second aperture within a mutually orthogonal plane.

18 Claims, 4 Drawing Sheets

US 6,454,470 B1

OPTOELECTRONIC INTERCONNECT MODULE

FIELD OF THE INVENTION

The present invention relates generally to optoelectronic interconnect modules for fiber optic communications. The present invention relates more specifically to an optoelectronic interconnect module enabling an optical transmitting or receiving semiconductor die to be mounted to a substrate with an optical axis perpendicular to an optical ferrule mounted to the optoelectronic interconnect module.

BACKGROUND OF THE INVENTION

Ultrafast optoelectronic transmitters are utilized in data communications systems wherein optical beams are modulated with electronic binary data pulses. The electronic pulses are conveyed by means of metallic conductors to a light-emitting semiconductor device, the modulated output of which may be transmitted over optical media (i.e., fiber optic cables).

Optoelectronic interconnect modules or optical subassemblies may be configured for direct mounting to a circuit substrate or a printed circuit board within the host system. In this arrangement, contact pins extend from the module and are typically soldered directly to contact points on the printed circuit board. The module is usually mounted near the edge of the printed circuit board such that the optical end of the module will protrude through a slot in an adjacent metal faceplate that may be mounted to the metal chassis of the host system.

A transceiver module includes provisions for connecting the module to an optical transfer medium such as a fiber optic cable. A typical arrangement, common to 1×9 modules, is to provide a transceiver module having an SC-duplex fiber optic connector receptacle integrally formed at the optical end of the module. The SC-duplex receptacle is configured to receive an SC-duplex connector in order to couple a pair of optical fibers to the optoelectronic interconnect module. A first optical fiber carries optical signals transmitted by the module, while a second optical fiber carries optical signals to be received by the module.

Ultrafast optoelectronic transceivers are capable of transmitting serial bit streams at rates above 10 Gbps. At these high data rates, electronic components and circuitry within the module are prone to generate undesired emissions and create electromagnetic interference with the surrounding equipment. Therefore, care must be taken to prevent spurious emissions from escaping from the module housing and disrupting the operation of nearby devices. Furthermore, electrical connections should be planar or straight to minimize signal distortion.

With reference to FIG. 1, a first embodiment of a prior art optoelectronic interconnect module is presented. The optoelectronic transceiver module 10 is inserted within the host chassis 12. The module 10 includes a metallic or metallized connector clip having a first prong 14 and a second prong 15 for receiving and retaining a fiber optic connector. Aligned concentrically within the connector clip 14, 15 is an optical subassembly. The optical subassembly includes an optical housing 16, optical lens 24, an annular mounting surface 32, an alignment ring 34, and an optoelectronic package 26. The external end of the optical housing 16 defines a ferrule bore 18 configured to receive a fiber optic connector ferrule 20 which aligns the optical fiber 22 carried within the ferrule 20 with the optoelectronic device contained within the optoelectronic package 26.

The optoelectonic package 26 is externally comprised of a metal cover 28, an optical window 29, and a base 30. The base 30 and cover 28 are both formed of metal and are joined by a conductive interface allowing the optoelectronic package 26 to be maintained at a controlled electrical potential. An insulating substrate 36 is provided within the optical package on the upper surface of the base. An optoelectronic and electronic semiconductor die 38 is mounted to the insulating substrate 36.

A plurality of signal pins extend through the base 30 and are wire-bonded to the optoelectronic and electronic semiconductor die 38, which is mounted to the insulating substrate 36. The signal pins 40, 42, 44 provide signal, voltage, ground to the optoelectronic and electronic semiconductor die 38 contained within the optoelectronic package 26. The signal and voltage pins 40, 42 are insulated from the base 30 by glass sleeves 46 disposed between the pins and the base. The ground pin 44 is connected to the base 30 by a weld joint 48.

With reference to FIG. 2, a second embodiment of a prior art optoelectronic interconnect module 50 is presented. An optoelectronic semiconductor die 52 is bonded parallel to the end surface 70 of an optical fiber 54 within an optical ferrule 56. The optoelectronic interconnect module housing 56 is constructed of an insulator and secured to a ceramic substrate 58. Electronic components 60 that interface with the optoelectronic interconnect module 50 are also attached to the ceramic substrate 58. Interconnect wires 62 provide an electrical connection between the electronic components 60 and the optoelectronic semiconductor die substrate 52. If the optoelectronic interconnect module 50 is functioning as a transmitter, optical radiation 66 emitted by the semiconductor die 52 passes through an optical lens or ball lens 68 in order to be properly focused on the end 70 of the optical filament or fiber 54. Similarly, if the optoelectronic interconnect module 50 is functioning as a receiver, optical radiation emitted from the end 70 of the optical fiber 54 passes through the ball lens 68 in order to be properly focused upon the semiconductor die 52.

As can be seen in the second embodiment of the prior art concept shown in FIG. 2, the semiconductor die 52 is mounted axially in-line to the ferrule 56 and perpendicular to the substrate 58, necessitating the connecting wires 62 to be bent about an angle 72 in order to connect with the electronic components 60. The resulting bend 72 in the connecting wires 62 produces undesired signal distortion. Furthermore, the bend 72 in the connecting wires 62 increases production costs and decreases reliability of the optoelectronic interconnect module 50.

The bend in connecting wires, which is basic to the electrical interconnection of both the referenced prior arts embodiments shown in FIGS. 1 and 2, poses basic limitations for ultra-fast optoelectronic transceiver performance. As compared to a planar or straight electrical interconnect counterpart, the bent interconnection:

increases production cost decreases reliability increases signal distortion

The cause of the signal distortion is explained in the following manner:

As the rate of data transmission increases, the connecting wires 62 providing electronic interconnection between the semiconductor die 52 and the electronic components 60 on the substrate 58 to which the module housing 56 is attached become a significant portion of signaling wavelength. In this operating regime, the connecting wires 62 behave as transmission lines with some impedance (Z).

With reference to FIG. 3, a schematic representation of the electronic interconnect between the semiconductor die contained within the optoelectronic housing and the electronic components is presented. As the interconnect impedance (Z) deviates from the system impedance (Z), frequency-dependent signal reflections will occur at the impedance mismatch, causing signal distortion. This signal distortion is the primary physical shortcoming in prior art designs that the present invention corrects by providing a planar interconnect that establishes an electronic connection of controlled impedance.

Accordingly, there is a need for an optoelectronic interconnect module that provides planar electronic interconnections and enables optical semiconductor die to be mounted in the same geometric plane as ancillary high speed electronic components within the transceiver assembly.

OBJECTS AND SUMMARY OF THE INVENTION

The objective of the present invention is to enable a semiconductor die, which transmits or receives optical signals, to be directly mounted to a circuit substrate mounting other components, using planarized or straight interconnecting wires and fiber optic transmission filaments.

A consequence of the objective of the present invention is to minimize signal distortion.

Another consequence of the objective of the present invention is to prevent unintentional radiation.

A further consequence of the objective of the present invention is to reduce production costs.

According to the present invention, an optoelectronic interconnect module is provided having a housing with a first aperture on a side for receiving an optical ferrule, and a second aperture on a bottom for receiving an optical package housing semiconductor die. A mirror is mounted within the housing at an angle for reflecting optical transmissions between the first and second apertures. A first optical lens is mounted between the first aperture and the mirror, and a second optical lens is mounted between the second aperture and the mirror.

DETAIL DISCUSSION OF THE PREFERRED EMBODIMENT

Figure 1:
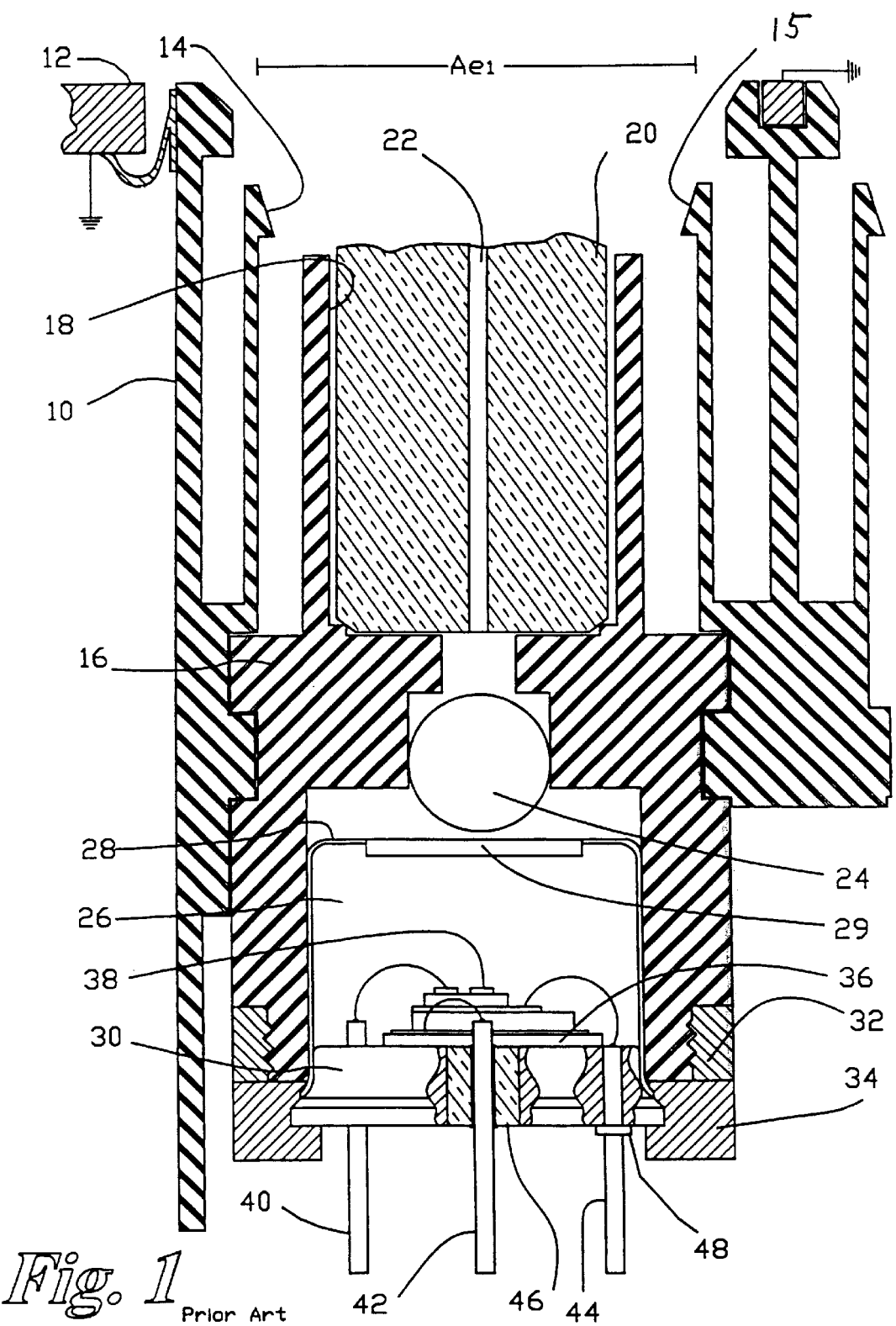
FIG. 1 is a cross-sectional view of an optoelectronic interconnect module configured in accordance with a first embodiment of the prior art.
Figure 2:
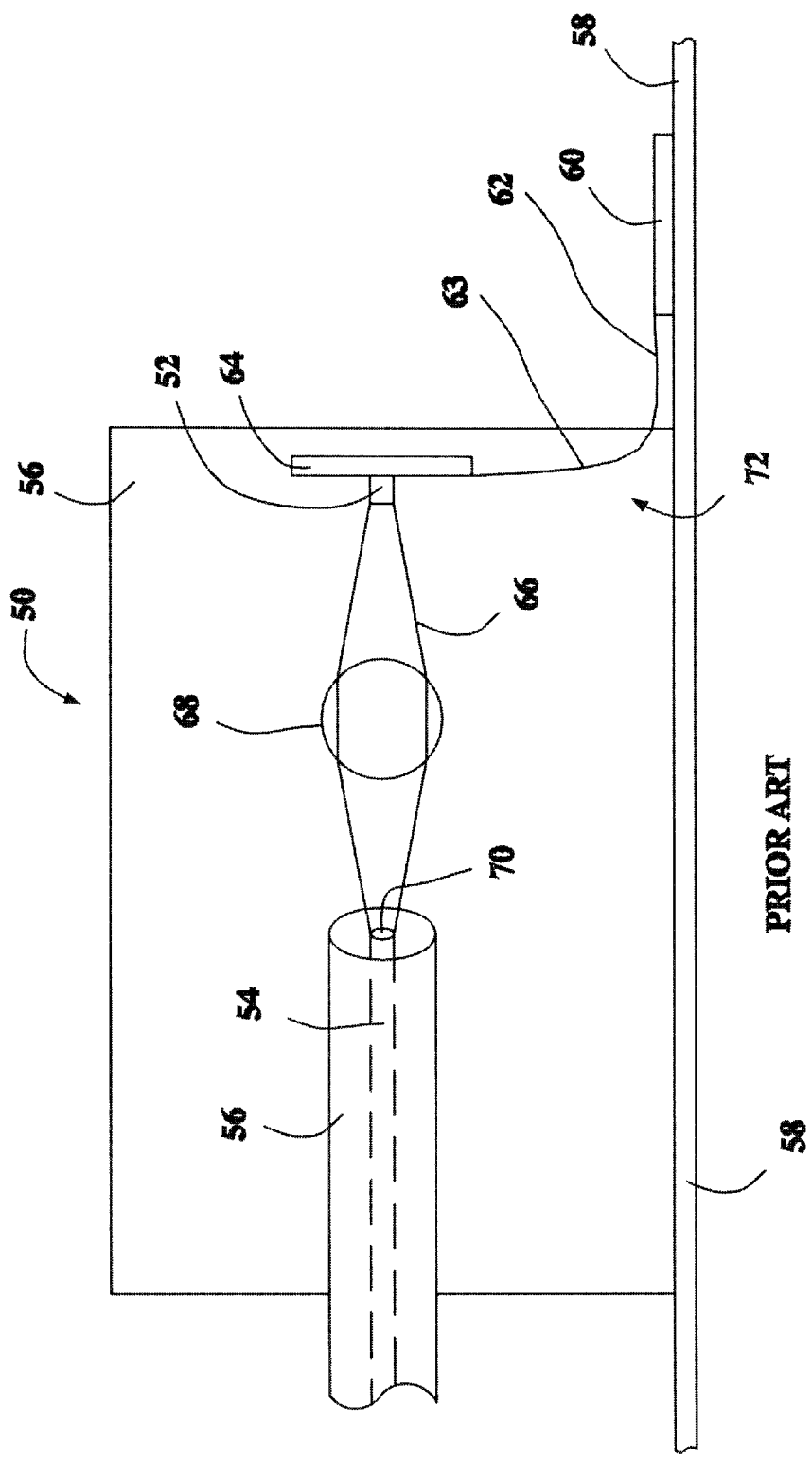
FIG. 2 is a cross-sectional view of a optoelectronic interconnect module configured in accordance with a second embodiment of the prior art.
Figure 3:
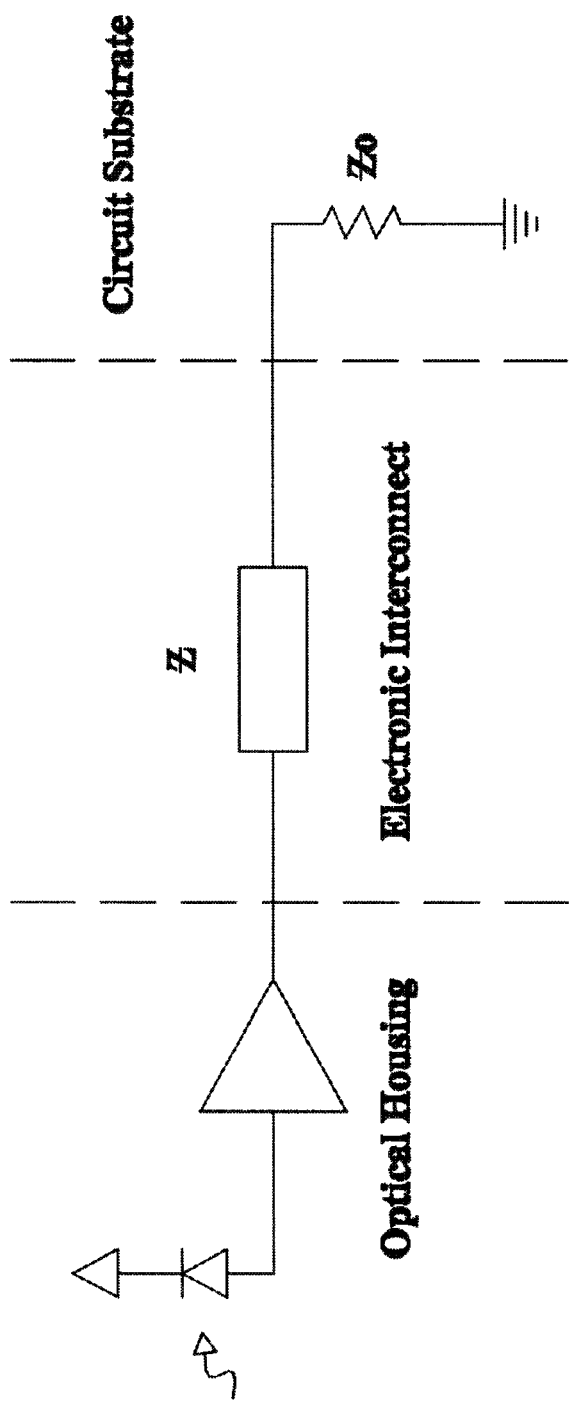
FIG. 3 is a circuit diagram illustrating impedance problems with the first and second embodiments of the prior art.
Figure 4:
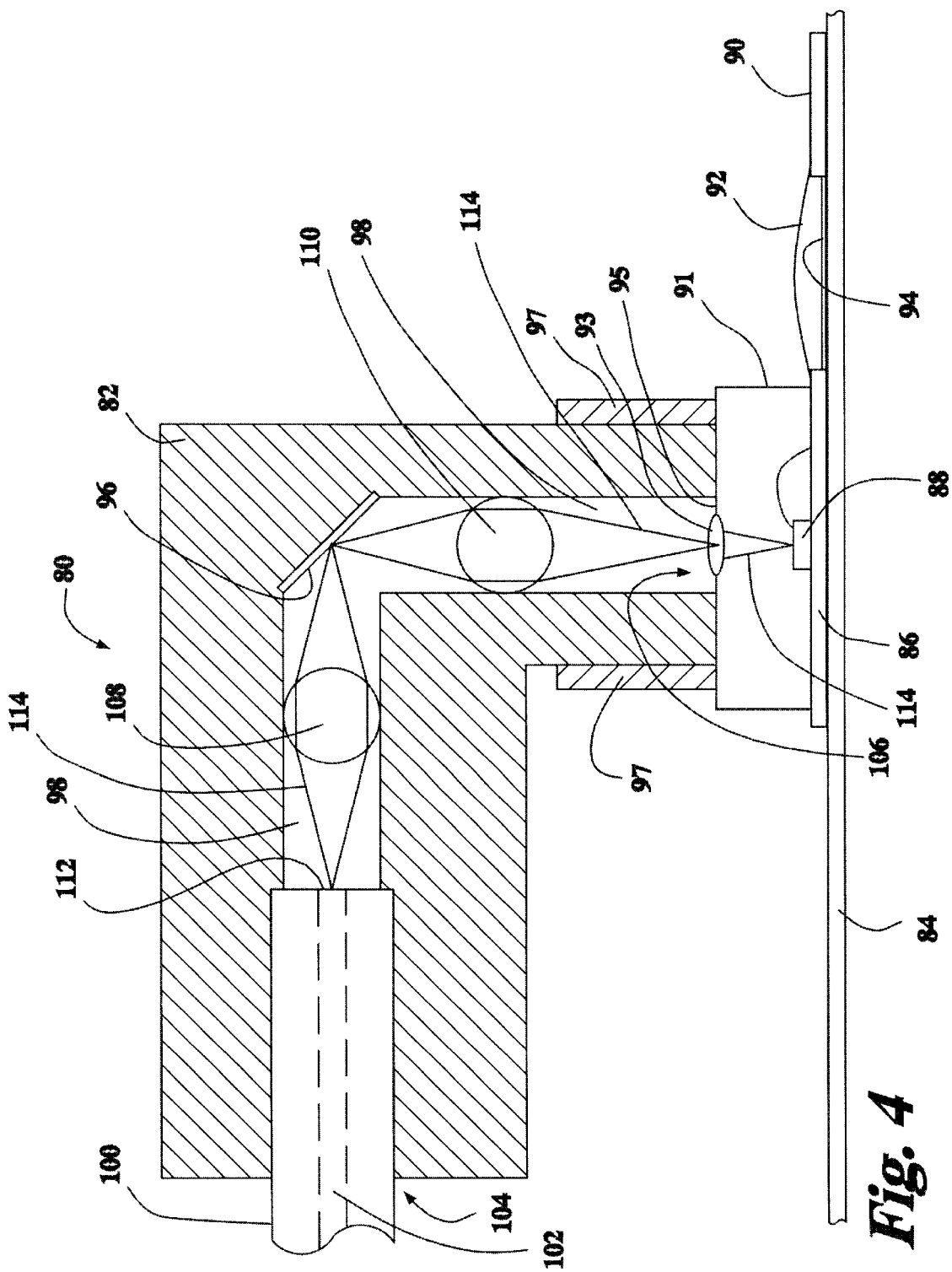
FIG. 4 is a cross-sectional view of an optoelectronic interconnect module configured in accordance with the present invention.

With reference to FIG. 4, the preferred embodiment of the optoelectronic interconnect module in accordance with the present invention is presented. The optoelectronic interconnect module 80 includes a housing 82 mounted to a circuit substrate or printed circuit board 84. The printed circuit board 84 is preferably constructed of a ceramic material. The housing 82 is preferably constructed of a polymer, such as plastic, but may also be constructed of glass, ceramic, or a micro-machined semiconductor. A base 86 for supporting a semiconductor die 88 is mounted to the circuit board 84.

The die 88 is hermetically sealed within a metal cover 91. A transparent window 93 is located on the top 95 of the metal cover 91 and opposite the die 88. The transparent window 93 enables optical radiation 114 to pass in or out of the hermetically sealed metal cover 91. In a receiver, the die 88 receives optical radiation 114 through the transparent window 93. In a transmitter, the die 88 emits optical radiation 114 out the transparent window 93. In either a receiver or a transmitter, the transparent window 93 is preferably constructed of plastic or glass. The metal cover 91 is preferably constructed of a nickel iron alloy, such as Kovar®, which is a registered trademark of Westinghouse Electric & Manufacturing Company in Pittsburgh.

A metal ring 97 surrounds the housing 82 adjacent to the second aperture 106. The metal ring 97 is laser welded to the top 95 of the metal cover 91 at a location to properly align the focal point of the second ball lens 110 with the transparent window 93. The metal ring 97 is preferably constructed of stainless steel.

The die 88 is electrically connected to other components 90 on the printed circuit board (PCB) 84 via a substantially straight connection wire or wires 92. The header 86 also can be connected to the other components 90 via a conductive trace or traces 94 located on the PCB 84. A mirror or reflective surface 96 is located at the bend of an inner passage 98 within the optoelectronic interconnect module 80. An optical ferrule 100 containing an optical fiber 102 is inserted into a first aperture 104 of the inner passage 98. The header 86 supporting the die 88 is located within a second aperture 106 of the inner passage 98. A first optical lens, such a ball lens 108, is located within the inner passage 98 between the mirror 96 and the end 112 of the optical fiber 102. A second optical lens, such as a ball lens 110, is located within the inner passage 98 between the mirror 96 and the die 88.

As can be seen in FIG. 4, the header 86 is mounted directly to the PCB 84. Accordingly, the header 86 supporting the die 88 can be mounted to the PCB 84 similar to other components 90. This feature allows for reduced time and costs associated with production and assembly of the PCB 84 and the optoelectronic interconnect module 80. Optical radiation 114 emitted by the die 88, after passing through the transparent window 93, is focused upon the mirror 96 by the ball lens 110. The light or optical radiation 114 is then reflected by the mirror 96 towards the end 112 of the optical fiber 102. The ball lens 108 is positioned within the inner passage 98 to properly focus light 114 reflected by the mirror 96 onto the end 112 of the optical fiber 102. Similarly, if the optoelectronic interconnect module is a receiver, light 114 emitted out the end 112 of the optical fiber 102 is focused on the mirror 96. The light 114 is then reflected off the mirror 96 towards the semiconductor die 88, which would be a photodetector in a receiver. The ball lens 110 is positioned within the inner passage 98 to properly focus the light 114 on the die 88 and through the window 93.

In accordance with the invention, the connection wires 92 between the die 88 and the other components 90 are relatively straight and sharp bends or turns in the connection wires 92 are avoided. Similarly, the semiconductor die 88 can be electrically connected to other components via conductive traces 94 located on the PCB 84. No special mounting or wire bending is required to mount the die 88 or electrically connect the die 88 to other components.

It is to be understood that the foregoing description is merely a disclosure of a particular embodiment and is no way intended to limit the scope of the invention. Several possible alterations and modifications will be apparent to those skilled in the art.

We claim as our invention:

1. An optoelectronic interconnect module, comprising:
   a housing having a first aperture on a first side of the housing for receiving an optical ferrule, and a second aperture on a second side of the housing for receiving a die;
   a reflective, non-transparent surface mounted within the housing at an angle for reflecting optical transmissions between the first and second apertures;
   a first optical ball lens mounted between the first aperture and the reflective surface; and
   a second optical ball lens mounted between the second aperture and the reflective surface.

2. The optoelectronic interconnect module of claim 1, further comprising: a substrate for mounting the housing, wherein the housing is mounted to the substrate.

3. The optoelectronic interconnect module of claim 1, further comprising: a die mounted immediately adjacent to the second aperture of the housing.

4. The optoelectronic interconnect module of claim 1, further comprising: a ferrule positioned within the first aperture.

5. The optoelectronic interconnect module of claim 1, wherein the housing is formed out of a polymer.

6. The optoelectronic interconnect module of claim 1, wherein the housing is formed out of plastic.

7. The optoelectronic interconnect module of claim 1, wherein the housing is formed out of a semiconductor material.

8. The optoelectronic interconnect module of claim 3, wherein the die includes a photodetector.

9. The optoelectronic interconnect module of claim 3, wherein the optoelectronic package includes a die.

10. The optoelectronic interconnect module of claim 9, wherein the phototransmitter is a Light Emitting Diode (LED).

11. The optoelectronic interconnect module of claim 9, wherein the phototransmitter is a Vertical-Cavity Surface-Emitting Laser (VCSEL).

12. The optoelectronic interconnect module of claim 2, further comprising:
    a component on the substrate, and
    a wire providing an electrical connection between the die and the component, wherein the wire is generally straight.

13. The optoelectronic interconnect module of claim 2, further comprising:
    a second component on the substrate and
    a conductive trace on the substrate providing an electrical connection between the die and the second component.

14. An optoelectronic interconnect module for receiving an optical ferrule, comprising:
    a housing having a first aperture on a first side of the housing for receiving an optical ferrule, and a second aperture on a second side of the housing for receiving a semiconductor die;
    a reflective, non-transparent surface mounted within the housing at an angle for reflecting optical transmissions between the first and second apertures;
    a first optical ball lens mounted between the first aperture and the reflective surface;
    a second optical ball lens mounted between the second aperture and the reflective surface;
    a circuit substrate;
    an optoelectronic package including a die mounted to the circuit substrate, wherein the second side of the housing in mounted to the optoelectronic package.

15. The optical interconnect module of claim 14, wherein the optoelectronic package includes a transparent window enabling optical radiation to pass through the optoelectronic package to and from the die.

16. The optical interconnect module of claim 14, further comprising:
    a component mounted to the circuit substrate;
    a conductive trace on the circuit substrate providing an electrical connection between the optical package and the component.

17. A method for communicating optical radiation between a die mounted to a circuit substrate and an optical ferrule mounted parallel to said circuit substrate, comprising the steps of:
    emitting optical radiation from the die mounted on the circuit substrate;
    focusing the optical radiation onto a reflective surface via a first optical ball lens;
    reflecting the optical radiation towards an end of an optical fiber contained within the optical ferrule; and
    focusing the reflected optical radiation onto the end of the optical fiber via a second optical ball lens.

18. A method for communicating optical radiation between a die mounted to a circuit substrate and an optical ferrule mounted parallel to said circuit substrate, comprising the steps of:
    emitting optical radiation out an end of an optical fiber;
    focusing the optical radiation onto a reflective surface via a first optical ball lens;
    reflecting the optical radiation towards a die mounted to a circuit substrate; and
    focusing the reflected optical radiation onto the die via a second optical ball lens.

* * * * *